INVENTORS
ANDREW J. HAAS &
THEODORE J. DETTLING

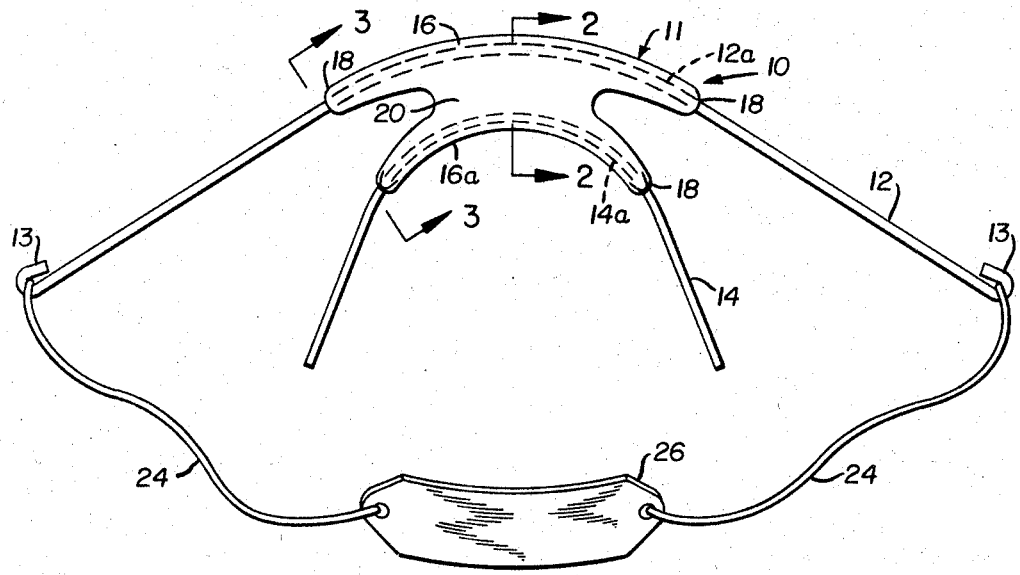
FIG. I
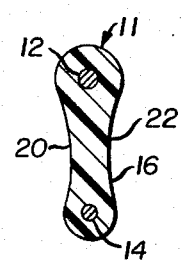
FIG. 2
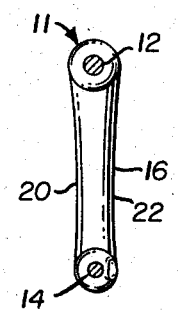
FIG. 3
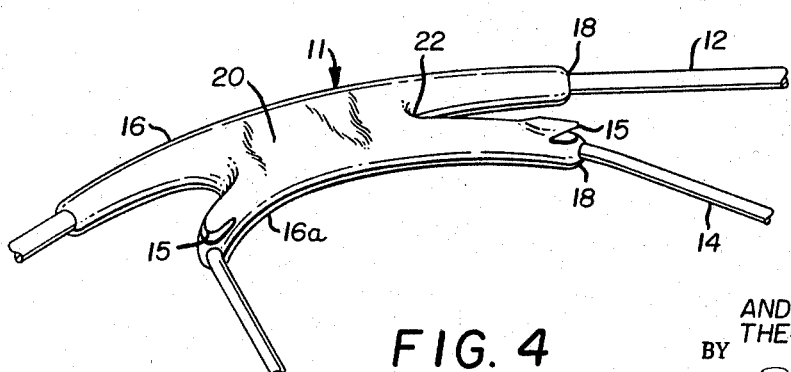
FIG. 4
INVENTORS
ANDREW J. HAAS &
THEODORE J. DETTLING
ATTORNEY

ATTORNEY

United States Patent Office 3,311,978
Patented Apr. 4, 1967

---

3,311,978
ORTHODONTIC FACE BOW
Andrew J. Haas, 657 Ecton Road 44303, and Theodore J. Dettling, 574 Castle Blvd. 44313, both of Akron, Ohio
Filed June 8, 1964, Ser. No. 373,190
3 Claims. (Cl. 32—14)

This invention refers to the orthodontic devices generally employed to align teeth relative to mouth structure. Specifically, it refers to the orthodontic implement used principally during sleeping hours and which is commonly called a face bow or night brace.

In current use, the face bow generally is composed of inner and outer arch members joined at their center portions by welding or soldering. The arch members must be spaced in order to accomplish intended purposes and, consequently, the joining of the arch members frequently entails severe bending of the outer arch member to effect the joining at the loop portion with the inner arch member.

Obviously, since the face bows must be adjustable to different sizes of tooth and mouth structures and must be able to yield to applied pressures, the arch members must contain some degree of resiliency and be durable in flexion.

The materials employed in the arch wires are generally of a type which have been tempered. The need of using heat during welding or soldering operations naturally destroys some of the properties gained through tempering, resulting in a general weakening of the wire. Additionally the necessary bending during joining of the wires also disturbs the natural property of the wires and contributes to the general weakening by creating areas of relative rigidity.

The comfort of the wearer is also a prime consideration in the use of face bows which, by nature, are relatively cumbersome and unsightly. Surface unevenness caused by the welding and bending are frequently irritable to a wearer. Likewise, the tendency of the welding substance to corrode and/or discolor sometimes produces an adverse effect on the good senses of the wearer actually resulting in the face bow not being worn as prescribed.

Efforts have been made to correct these disadvantages. Mainly, these efforts are directed toward the methods of applying soldering or welding materials in an attempt to minimize the known deficiencies occurring through application of these materials. Plastic coatings for cloaking some of the unevenness and seaming are also being employed.

Despite these improvements, the above described inherent weaknesses still remain. Lasting improvement, it has been discovered, can be achieved by eliminating the need of soldering or welding. Specifically, it has been found that the natural curvature of the inner and outer arch wires may be preserved while, at the same time, avoiding any contact between the wires at their point of closest adjacency through use of a plastic-like central casing. Therefore, one wire is not bent into contact with the other wire and retained by soldering and welding resulting in all the aforementioned deficiencies of seaming. Further, plastic-like materials admit to polishing and blending so that there will be no roughened areas or edges likely to irritate the wearer. Natural curvature, desired spacing, and necessary resiliency are all maintained and retained.

Orthodontists have found that if the ends of the face bow are positioned at the furtherest point projection at the teeth that a desired torquing will result with respect to the teeth being straightened. Specifically, by bending the outer body, a force vector representing a combination of vertical and horizontal movement can be presented around the tooth edge so as to torque the same around the root for orthodontic purposes.

It, therefore, becomes the primary object of this invention to provide an improved face bow in which all natural and desired properties are retained by eliminating the need for soldering or welding.

A further object is in providing added comfort by dispensing with uneven seams and unsightly corrosion.

These and other objects will become more apparent upon a reading of the following brief specification, taken and interpreted in the light of the following drawings.

Of the drawings:

FIGURE 1 is a top plan view of the improved face bow.

FIGURE 2 is a cross sectional view taken on the lines 2—2 of FIGURE 1.

FIGURE 3 is a cross sectional view taken on the lines 3—3 of FIGURE 1.

FIGURE 4 is a partial perspective view with the outer arch wires broken away.

Figure 5:
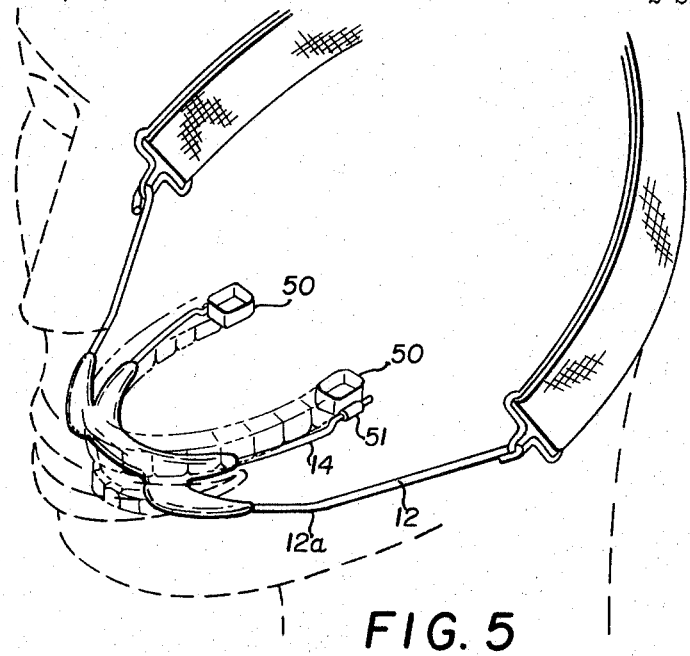
FIGURE 5 is a fragmentary view showing the face body associated with orthodontic structures associated with the upper teeth of a patient.

Referring now to FIGURE 1 of the drawings, it will be seen that the face bow, generally indicated by the numeral 10, is shown composed of a head gear 11 having outer arch wire 12 and an inner arch wire 14 enclosed in a central casing 16 of plastic-like material.

While it is preferred that the casing 16 be constructed of a plastic-like material, it is to be understood that other materials of rubber or like compound may be used provided that the same possess the requisite rigidity required to maintain the bow members in their condition of alignment with each other so that forces applied to the outer bow may, for example, be transmitted to the casing 16 to the inner bow, with the casing 16 accordingly possessing a modicum of resiliency for this purpose.

Further from FIGURE 1, it will be seen that loop portion 12a of outer arch wire 12 and loop portion 14a of inner arch wire 14 are spaced, as is clearly evident, and are not bent into any contact necessitating seaming by welding or soldering. Also apparent is the fact that the unjoined loop portions 12a and 14a permit the wires 12 and 14 to retain natural configurations which are not subject to malformations and treatment resulting in reducing or detracting from the natural properties intended.

The casing 16, in addition to its mechanical use as a means of carrying and spacing the wires 12 and 14, may be otherwise employed in the face bow 10 with consequent advantageous results. It is possible, for instance, to eliminate any uneven seaming at all points of protrusion, indicated by numeral 18, where the wires 12 and 14 come out of the casing 16. The casing 16 may be rounded and blended so that all point of protrusion 18, 18 may be extremely smooth. Likewise, the medial portion 20 may be polished and blended to insure the positive smoothness of all surfaces and edges. Preferably portion 20 is contoured, as at 22, to provide a more natural lip rest.

In use and operation inner wire 14 and casing 16 will be inserted into the mouth with the surface 16a placed into adjacency on contact with the labial side of the upper teeth. Wire 14 will then be anchored to the molars in the usual manner. Casing 16 will protrude between the lips with the polished and contoured surfaces thereof providing a comfortable lip rest. Outer wire 12 is already adjacent the outside area of the mouth and it will not be necessary to depress or pinch the skin in the area of the mouth while "cornering" to encircle the cheeks. Terminal hooks 13 on the outer wire 12 receive the rubber bands 24 connecting to the usual neck band 26 behind the head. Hooks 15, integral with casing 16 and disposed adjacent inner wire 14 may be used to receive rubber bands as normally desired by the orthodontist.

There has been shown, then, a face bow in which methods previously and necessarily employed with consequent tendency toward weakening and roughening the face bow are eliminated. The use of a central casing obviates the need of seaming by welding or soldering as well as eliminating the introduction of materials subject to corrosion. Roughened areas and edges irritable to a wearer need no longer be present. Necessary resiliency as well as spacing at the point of closest adjacency in the natural curvature of the inner and outer wires is maintained. Not only has the face bow been inherently strengthened, but it also provides greatly increased comfort to the wearer.

Figure 6:
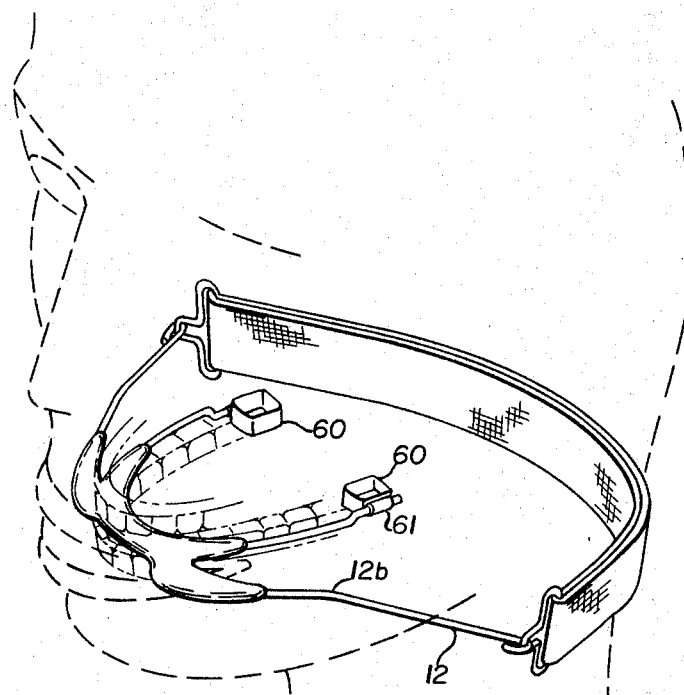
FIGURE 6 is a similar view but showing the face body associated with orthodontic structures associated with the lower teeth of a patient.

Referring now to FIGURES 5 and 6, it will be seen from FIGURE 5 that teeth caps 50, 50 have sockets 51, 51 within which the projecting ends of the arm 14 may be received, with these ends being offset as shown for the purpose of providing a stop that limits the extent of insertion thereof in sockets 51. Also, it will be noted that the arm 12 is bent as at 12a in upward fashion so that a downward force is applied by the arm 14 on the socket 51. This force has been found to be downwardly and rearwardly so as to create a torquing around the root of the tooth that serves to torque the same posteriorly for straightening purposes.

Likewise, in FIGURE 6, the similar jackets 60, 60 having sockets 61 are attached to the lower rear teeth and serve as the point of insertion for the ends of the arm 14. In this case, the arm 12 is bent downwardly as at 12b and the resultant force occuring is one that is merely upwardly and rearwardly so as to in effect tip the tooth posteriorly around its root.

It will be noted that maximum torque is obtained in both instances by securing the socket 51 or 61 adjacent the point of maximum tooth projection with such positioning serving to create a torque force having a greater moment.

It is, of course, to be understood that the fitting of the cooperating orthodontic structures for the face bow will be accomplished by the orthodontist following examination and provision for tooth support.

While a full and complete description of the invention has been set forth in accordance with the dictates of the Patent Statutes, it is to be understood that the invention is not intended to be limited to the specific embodiment herein shown.

Accordingly, modifications of the invention may be resorted to without departing from the spirit hereof or the scope of the appended claims.

What is claimed is:
1. A face bow of the character described, comprising;
   (A) a pair of arch wires each having central curved portions;
   (B) a central unitary casing having a modicum of resiliency and completely encircling said arch wires in the approximate region of their central curved portions, whereby said arch wires are spaced from each other in the area of continuously curved proximity with each other so as to define inner and outer arch wires lying in a common plane;
   (C) and connecting means carried by the ends of one said arch wire and adapted to support said face bow with respect to the mouth of a user.
2. The face bow of claim 1 further characterized by the fact that said casing is formed from plastic material that provides blended rounded enclosure of said arch wires with a web-like medial support portion therebetween.
3. A face bow of the character described, comprising;
   (A) a face gear having inner and outer arch wires,
   (B) a central casing enclosing said inner and outer wires in spaced relationship at their point of closest adjacency relative to the natural curvature of said wires,
   (C) said casing being rounded and blended at the points where said inner and outer wires protrude therefrom,
   (D) said casing having a contoured medial portion defining a lip rest,
   (E) terminal hooks on said outer wire,
   (F) hooks integral with said casing disposed adjacent said inner wire,
   (G) said hooks providing means for engaging associated elements of said face bow.

References Cited by the Examiner

UNITED STATES PATENTS

| | | | |
|---|---|---|---|
| 2,814,293 | 11/1957 | Gabb et al. | 128—146 |
| 2,880,509 | 4/1959 | Strickler | 32—14 |
| 3,111,758 | 11/1963 | Winkler | 32—14 |

OTHER REFERENCES

Appco ad in the American Journal of Orthodontics, vol. 49, No. 8, August 1963, page 11.

ROBERT E. MORGAN, *Acting Primary Examiner.*

RICHARD A. GAUDET, *Examiner.*

J. W. HINEY, JR., *Assistant Examiner.*